United States Patent
Stefanov Stefanov et al.

(10) Patent No.: US 11,720,760 B2
(45) Date of Patent: Aug. 8, 2023

(54) METHOD OF ABBREVIATED TYPING AND COMPRESSION OF TEXTS WRITTEN IN LANGUAGES USING ALPHABETIC SCRIPTS

(71) Applicant: AbbType Ltd, Haskovo (BG)

(72) Inventors: Huben Stefanov Stefanov, Haskovo (BG); Huben Zlatkov Stefanov, Haskovo (BG)

(73) Assignee: AbbType Ltd, Haskovo (BG)

( * ) Notice: Subject to any disclaimer, the term of this patent is extended or adjusted under 35 U.S.C. 154(b) by 0 days.

(21) Appl. No.: 16/652,490

(22) PCT Filed: May 2, 2019

(86) PCT No.: PCT/EP2019/061275
§ 371 (c)(1),
(2) Date: Mar. 31, 2020

(87) PCT Pub. No.: WO2019/215016
PCT Pub. Date: Nov. 14, 2019

(65) Prior Publication Data
US 2021/0383076 A1 Dec. 9, 2021

(30) Foreign Application Priority Data
May 11, 2018 (EP) .................................... 18171914

(51) Int. Cl.
*G06F 40/44* (2020.01)
*G06F 40/56* (2020.01)
*G06F 40/289* (2020.01)

(52) U.S. Cl.
CPC ............ *G06F 40/44* (2020.01); *G06F 40/289* (2020.01); *G06F 40/56* (2020.01)

(58) Field of Classification Search
CPC ........ G06F 40/44; G06F 40/289; G06F 40/56; G06F 17/2217; G06F 17/276; G06F 17/273; G06F 17/2735
(Continued)

(56) References Cited

U.S. PATENT DOCUMENTS 4,760,528 A * 7/1988 Levin ....................... G06F 3/023
715/234
4,893,238 A * 1/1990 Venema ................ G06F 40/274
715/236
(Continued)

FOREIGN PATENT DOCUMENTS

EP 0083393 A2 7/1983
EP 0089468 B1 8/1988
(Continued)

OTHER PUBLICATIONS

International Search Report issued in PCT/EP2019/061275, dated Jun. 6, 2019.

*Primary Examiner* — Edwin S Leland, III
(74) *Attorney, Agent, or Firm* — Locke Lord LLP; Scott D. Wofsy; Michael J. Pollack

(57) ABSTRACT

The invention provides a computer implemented method of drafting of abbreviations for the statistically most frequent word forms and phrases for the purposes of computer typing and compression of texts written in languages using alphabetic scripts with full vowel representation. Therein, drafted abbreviations do not constitute meaningful word forms of a given language, for which they are drafted. Every abbreviated word form or phrase is attributed only one unique and exclusive abbreviation, which is based on the letters contained in this abbreviated word form or phrase and in accordance with the order, in which these letters appear in the abbreviated word form or phrase. For a given word form, one-letter, two-letter, three-letter and four-letter abbrevia- (Continued)

```
drafting a one-letter abbreviation
```

```
drafting a two-letter abbreviation
```

```
drafting a three-letter abbreviation
``` tions of the word forms are chosen according to the statistical frequency of the word forms in a way that allows the mathematically most efficient process of abbreviation of the text.

12 Claims, 1 Drawing Sheet

(58) Field of Classification Search
USPC .................................................. 704/4
See application file for complete search history.

(56) References Cited

U.S. PATENT DOCUMENTS

| 4,969,097 | A | * | 11/1990 | Levin | ...................... | G06F 3/023 |
| | | | | | | 715/234 |
| 5,623,406 | A | * | 4/1997 | Ichbiah | ................... | G06F 9/453 |
| | | | | | | 704/3 |
| 6,279,018 | B1 | * | 8/2001 | Kudrolli | ............... | G06F 40/284 |
| | | | | | | 715/234 |
| 6,847,966 | B1 | * | 1/2005 | Sommer | ............. | G06F 16/3347 |
| | | | | | | 707/739 |
| 2009/0216911 | A1 | * | 8/2009 | Long | ..................... | G06F 40/274 |
| | | | | | | 710/2 |
| 2014/0156258 | A1 | * | 6/2014 | Suzuki | ................... | G06F 40/47 |
| | | | | | | 704/3 |
| 2021/0383076 | A1 | * | 12/2021 | Stefanov Stefanov | ..................... | |
| | | | | | | G06F 40/289 |

FOREIGN PATENT DOCUMENTS

| EP | 0352377 | A1 | | 1/1990 | | |
| EP | 3567495 | A1 | * | 11/2019 | ........... | G06F 40/126 |

* cited by examiner

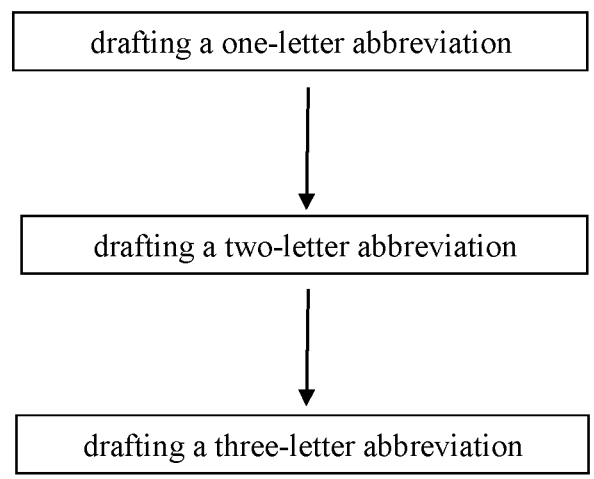

METHOD OF ABBREVIATED TYPING AND COMPRESSION OF TEXTS WRITTEN IN LANGUAGES USING ALPHABETIC SCRIPTS

CROSS-REFERENCE TO RELATED APPLICATIONS

This application is a U.S. National Phase Application filed under 35 U.S.C. § 371, based on International PCT Patent Application No. PCT/EP2019/061275, filed May 2, 2019, which application claims priority to European Patent Application No. 18171914.7 filed on May 11, 2018. The entire contents of these applications is incorporated herein by reference.

SUMMARY

Innovative method of abbreviation for the purposes of computer typing and compression of texts written in a language using alphabetic script with full vowel representation. A new standard method is applied to the statistically most frequent word forms and phrases in order to create a set of automatically expanding abbreviations, which allow faster and more correct typing of texts on the computer keyboard. The applied abbreviation method in some cases does not require strict memorisation of the abbreviations by the users. The same abbreviations may be used for compression of texts in order to solve numerous technical problems, while the compressed texts remain human-readable.

TECHNICAL FIELD—BACKGROUND OF THE INVENTION

During the last 40 years several methods of abbreviated typing of texts (mainly English language texts) have been patented in Europe and in the United States. There are also several patents concerning alphanumeric compression of texts.

The present invention relates to an improvement in computer word processing in order to facilitate electronic communication, and particularly to a method of fast and correct entering of the most frequent word forms and phrases into computer equipment with reduced number of keystrokes by means of automatically expanding abbreviations. The same abbreviations may also serve for more efficient alphanumeric compression of texts, which remain human-readable after the compression.

This new abbreviation method concerns full alphabets alphabetic writing systems in the narrow sense of the word "alphabetic" that is writing systems, which use full vowel representation, such as Greek, Latin, English, French, German, Spanish, Russian, Polish or Bulgarian writing systems, where all vowels are represented in the text and those vowels have status equal to consonants.

This invention does not concern writing systems, where letters represent consonants (such a script is called an abjad), nor the so called syllabaries (in which each character represents a syllable), nor the so called abugidas or alphasyllabaries, where consonant-vowel sequences are written as a unit (each unit is based on a consonant letter and vowel notation is secondary).

CLOSEST PRIOR ART

As far as abbreviated typing systems (called also "coding systems") are concerned, the often cited European and US patents are:

EPO patent number, title and date of filing:
EP 0 089 468 B1
Abbreviated typing with special form of display
28 Jan. 1983
Proprietor: International Business Machines Corporation
Inventors: Howell, D. M.; Kolpek R. A.; Trevathan L. S.

Advantage of this system consists in the fact that no abbreviation is identical with a word of the language being written (English). This is a positive aspect of this system, because English words are not used as abbreviations.

Abbreviations are of maximum length of 4 alphabetic characters. Every abbreviation comprises at least 2 characters.

Phrases are initialised in this system.

This system describes several predesignated suffix abbreviations. Suffix abbreviations are generally the same for the same suffix. For example English suffixes "ing" and "ly"—contained in the word "accordingly"—are respectively abbreviated to letters "g" and "y". The root "accord-" is abbreviated to letters "ac". Thus, the word "accordingly" is abbreviated to "acgy". The word "selling" has been abbreviated to "selg". The word "maturing" has been abbreviated to "mtrg". The word "treasury" has been abbreviated to "trs". The word "preliminary" has been abbreviated to "prm".

The word "Wednesday" has been abbreviated to "wed". Positive aspect of this abbreviation consists in the fact that typist can type lower case letter "w" instead of capital letter "W". This is a convenience to the typist.

It is a drawback of this system that abbreviations for the roots (word stems) are not composed systematically and must be learnt by heart.

EPO and US patent numbers, titles and dates of filing:
EP 0 352 377 A1
Word processing apparatus and method
26 Jul. 1988
Applicant: Levin, Leonid D.
Inventor: Levin, Leonid D.

This patent concerns not only English, but also Spanish, French and German language. Earlier, two similar patents have been filed by the same inventor in the United States: U.S. Pat. No. 4,760,528 A, "Method for entering text using abbreviated word forms", filing date 18 Sep. 1985; U.S. Pat. No. 4,969,097 A, "Method of rapid entering of text into computer equipment", filing date 21 Jul. 1988.

First of all, it must be pointed out that this alphabetic shorthand system is well known internationally and serves as one of the references in the field of alphabetic shorthand systems for English language. It is based on very good linguistic knowledge of the structure and morphology of words in English writing. Abbreviations for the words are mainly created by replacing predefined English morphological prefixes and suffixes with single letters.

For example, in order to form the abbreviation for a particular word: prefixes "corn", "con", "cor" are abbreviated to single letter "c"; prefixes "im", "in", "inter" are abbreviated to single letter "i"; suffixes "able", "ible", "le" are abbreviated to single letter "l"; suffixes "ant", "ent", "anent", "nt" are abbreviated to single letter "n"; suffix "ed" is abbreviated to single letter "d"; suffix "ing" is abbreviated to single letter "g".

However, there are also some English suffixes, which are encoded with a single letter, which is not contained in the encoded word. It results in creating a shorter code for a given word, but this shorter code is not an abbreviation in the strict sense. It is a drawback of this system, because drafted codes are not 100% based on the letters contained in the encoded words.

For example: suffix "tion" is encoded with a single letter "h"; suffix "ly" is encoded with a single letter "i"; suffixes "age", "ge" are encoded with a single letter "j"; suffix "sion" is encoded with a single letter "z".

This system defines a set of rules for classifying and encoding English words.

1) The so called simple words, which do not have prefixes nor suffixes, are encoded with the first two and last two letters. For example, the word "aircraft" is entered on the keyboard with the four letter code "aift".

2) The so called prefix words are encoded with a single letter for the prefix and up to four letters, which follow the prefix. For example, word "condominium" contains the prefix "con", which is abbreviated to single letter "c". The typist enters on the keyboard letters "cdomi", that is letter "c" representing predefined prefix, plus letters "domi" representing the succeeding four letters.

3) The so called suffix words are encoded with a single letter for the suffix and up to the first four letters of the word. For example, the word "possibility" is entered on the keyboard with the abbreviation "posst", that is with the first four letters of the word, plus letter "t" identifying the predefined suffix "ty".

4) The so called prefix/suffix words, where prefix is encoded with one letter, then up to four letters following the prefix are typed and one letter representing the suffix at the end. Sometimes identical codes are drafted for different English words and computer user has to choose, which word will be typed with a particular code. This so called "conflict resolution" must be done by the computer user (the typist) on individual or on global basis.

US patent number, title and date of filing:
U.S. Pat. No. 5,623,406 A
Method and system for entering text in computer equipment
6 Mar. 1995
Assignee: Ichbiah, J. D.
Inventor: Ichbiah, J. D.

This system uses non-fixed abbreviations for frequent words and phrases of different groups of computer users as well as plurality of pre-existing subject specific current glossaries.

Word abbreviations start with the initial letter and include other letters of the abbreviated word. This system does not provide for unique abbreviations. One word form can be attributed several different abbreviations at the same time. It may also happen that more than one word or phrase are attributed the same abbreviation and computer users have to choose the appropriate option. Words written with first capital letter can be abbreviated with lower case letters. Phrases are initialised.

US patent number, title and date of filing:
US 2009/0216911 A1
Method and system for intuitive coding to enter text expansions
21 Feb. 2008
Assignee: Long, L.
Inventor: Long, L.

This system is based on the so called "sayables", which were defined as separately naturally pronounced sounds of a given word. It is also based on coding with single letter of predefined English prefixes and suffixes. System is not 100% based on the letters contained in the encoded words.

For example: the word "questionnaire" is encoded with letters "qtxa" and the word "forward" with letters "fwx".

Many different prefixes are replaced by letter "q", which is not contained in the encoded words. For example: word "telecommunication" containing prefix "tele" is encoded with letters "qcmnn".

US patent number, title and date of filing:
U.S. Pat. No. 4,893,238 A
Text processing device for stenographic typing
17 Feb. 1988
Assignee: U.S. Philips Corporation
Inventor: Venema, I.

This system was patented only for Dutch language. It contains the so called "main set of abbreviations" composed of lists of frequent Dutch word forms and phrases. It is assumed that by providing one or more smaller "auxiliary sets of abbreviations", there will be an overall saving as regards the number of keystrokes. This is a positive aspect of this system.

The abbreviations are mainly drafted on the basis of the first letters of separately pronounced parts of the word (for example, the first letters of respective syllables). There are also one-letter abbreviations for the most frequent Dutch words. Phrases are initialised. The names of the months are typed with digit codes.

As far as the systems for alphanumeric compression (contraction) of English language texts are concerned, the often cited European and US patents are:

EPO patent number, title and date of filing:
EP 0083393 A2
Improved method for compression of the digital representation of English text
25 Sep. 1982
Applicant: System Development Corporation
Inventor: Snow, C. A.

In order to reduce the length of stored textual information, this system employs a list of predefined English prefixes and suffixes, which are encoded in compressed (shortened) form. In addition, special types of encoding have been provided for 80 high frequency words and for 512 medium frequency words.

US patent number, title and date of filing:
U.S. Pat. No. 6,279,018 B1
Abbreviating and compacting text to cope with display space constraint in computer software
23 Feb. 1999
Assignee: Kudrollis Software Inventions
Inventors: Kudrolli, A. S.; Kudrolli, P., Kudrolli, F.

In order to reduce the length of stored textual information and to cope with display space constraint (spatial limitations of the display screen of electronic devices or printed page), this system uses different compression, abbreviation and encoding methods, such as deleting of blank spaces separating words, deleting of predefined non-alphabetic characters, omission of vowels within the words, omission of phonetically less significant characters within the words, replacing the sequence of two repeating consonants with only one such consonant, truncation of words exceeding required length limit, truncation of text from the right end, initialisation of phrases (acronyms), conversion of enumeration words into digits (for example replacement of the word "seven" by digit "7") and replacement of some words by special symbols (for example replacement of the word "and" by a special symbol "&").

Technical Nature of the Invention—Methodological Improvements in the Present Invention First and foremost, in this patent application a clear terminological distinction is made between the notion of "word" and the notion of "word form". In many Indo-European languages one word (for example, one verb) can have very numerous word forms (for example, in the case of word forms of Polish or French verbs). The statistical frequencies mentioned in this patent application refer to the statistical frequency of the word forms and not to the statistical frequency of the whole words.

Also, in the present system:
- there are two new methods (techniques) of abbreviation of word forms and one new method (technique) of abbreviation of phrases;
- there is new hierarchical (gradual) 7 steps approach to abbreviation of word forms and 2 steps approach to abbreviation of phrases, which can be executed automatically by the properly programmed computer;
- abbreviations are wholly (100%) based on actual spelling of the abbreviated word forms and phrases;
- every abbreviated word form or phrase has its unique and exclusive abbreviation, which is attributed only to that particular word form or phrase (this feature of the system will allow reading of the shorter compressed text written with non-expanded abbreviations);
- abbreviations do not constitute meaningful word forms in a given language, for which they are drafted, and, consequently, their application does not interfere with the standard computer typing process of the texts in this language. Thus, they may be expanded with Space key together with other elements of the text;
- often, there is no need to memorise strictly the abbreviations, because knowledge of the applied methods (techniques) permits working without strict memorisation of the abbreviations for particular word forms or phrases (in fact, only one-letter, two-letter, three-letter or four-letter abbreviations applied respectively in the first, third, fifth and seventh place should be strictly memorised, while the abbreviations drafted according to other methods may easily be reconstituted by the users, if they at least remember, which word forms or phrases were abbreviated);
- the number of abbreviations is limited, because they are drafted only for the most frequent word forms and phrases;
- the system is based on comprehensive statistical research of a given language and, consequently, proposed abbreviations cover large part of every text in this language, for example on the statistical frequency of word forms and phrases in the spoken language texts (direct speech acts between the people), electronic communication texts or in the texts of court judgements;
- the system may be used for text messaging, mobile phones and other portable electronic devices, if abbreviations are drafted by taking into account the frequencies of the word forms and phrases in the language of electronic communication;
- the system takes full advantage of the potential of the linguistic theory called "Zipf law", which concerns frequencies of the word forms in languages;
- typing abbreviation for a word form beginning with capital letter can be drafted in lower case letters only. Consequently, there is no need to press and hold "Shift" key in order to type this capital letter (this feature of the system is of great importance for the German language);
- this invention introduces new standardised system of abbreviation methods (techniques), which can be applied to many different languages using alphabetic script with full vowel representation (equally, to the so called prefixing languages and the so called suffixing languages). Thus, the adopted methodology is not specific to English language, nor to the morphology of its words.

OBJECTIVE TECHNICAL PROBLEMS SOLVED BY THIS INVENTION

This computer implemented invention serves for bidirectional alphanumeric expansion and contraction of texts drafted in a language using alphabetic script (that is for expanding the short abbreviations into full text or—alternatively—shortening the full text into the short abbreviations).

As far as compression of the text is concerned, this invention achieves significant reduction of the length of the text and improvement in the readable abbreviated graphic representation of the language. Computer users obtain shorter, readable and understandable text, in which some words are fully written and other words or phrases are represented by the abbreviations.

There are OBJECTIVE TECHNICAL PROBLEMS in the field of text compression, as follows:
- storage of the text in electronic format on the computer disc or other medium requires too much space;
- text is too long to be transferred in electronic way or is transferred too slow;
- text requires too much space on the screen of the computer or other electronic devices (this is the so called "screen display constraint");
- there are too many letters and other graphic elements in the text (the number of graphic elements in the text should be reduced);
- text takes too much space when printed (printing space should be reduced);
- printing of the text requires too much printing materials;
- in some cases the compressed text should be human-readable (conventional compression renders a text message unreadable to humans).

Consequently, the following TECHNICAL FEATURES must be taken into consideration in the field of text compression:
- number of letters in the text (number of graphic elements in the text);
- electronic space required for storage of the text in electronic format;
- space occupied by the text on the screen of the computer or other electronic device;
- space occupied by the printed text;
- required quantity of printing materials;
- possibility of reading the compressed text.

This invention has the following DIFFERENCES FROM THE CLOSEST PRIOR ART in the field of text compression:
- smaller number of letters in the text (smaller number of graphic elements in the text);
- less electronic space required for saving of the text in electronic format;
- text takes less space on the screen of the computer or other devices;
- text takes less space when printed;
- smaller quantity of printing materials is required;
- compressed text is human-readable;
- number of abbreviations is limited;
- every abbreviated word form or phrase has its unique and exclusive abbreviation;
- abbreviations are wholly (100%) based on actual spelling of the abbreviated word forms and phrases;

abbreviations do not constitute meaningful word forms in a given language, for which they are drafted, and can easily be distinguished from other elements of the compressed text.

As far as the abbreviated typing of the text is concerned, this invention achieves a smaller number of keystrokes required to type the text (higher productivity of the typing process), a high level of overall coverage of the text with abbreviations, a high ratio of the text typed with abbreviations to the number of performed keystrokes, a possibility of expanding the abbreviations during typing only with Space key, a possibility of abbreviated typing without using special symbols, a possibility of abbreviated typing without using letters, which are not contained in the abbreviated word forms or phrases, a low level of difficulty of the abbreviation method.

There are OBJECTIVE TECHNICAL PROBLEMS in the field of abbreviated typing, as follows:

great number of keystrokes required to type the text (low productivity of the typing process);
level of coverage of the text with abbreviations or codes;
ratio of volume of text typed with abbreviations to the number of keystrokes, which must be performed;
lack of possibility of expanding the abbreviations only with Space key, together with other elements of the text, without any mutual interferences;
usage of special symbols in order to perform abbreviated typing;
usage of letters, which are not contained in the abbreviated text;
very difficult abbreviation methodology.

Consequently, the following TECHNICAL FEATURES must be taken into consideration in the field of abbreviated typing:

number of keystrokes required to type the text (productivity of the typing process);
level of coverage of the text with abbreviations;
ratio of volume of the typed text to the number of keystrokes;
possibility of expanding the abbreviations only with Space key;
usage of special symbols in order to perform abbreviated typing;
usage of letters, which are not contained in the abbreviated word forms;
level of difficulty of the abbreviation methodology.

This invention has the following DIFFERENCES FROM THE CLOSEST PRIOR ART in the field of abbreviated typing:

smaller number of keystrokes required to type the text (higher productivity of the typing process) and the resulting facilitation of electronic communication between people;
higher level of coverage of the text with abbreviations;
higher ratio of volume of the typed text to the number of keystrokes;
there is a possibility of expanding the abbreviations only with Space key, because abbreviations do not constitute meaningful words in a given language, for which they are drafted, and their application does not interfere with the standard typing process;
no special symbols are used in order to perform abbreviated typing;
letters, which are not contained in the abbreviated word forms, are not used in order to perform typing, because abbreviations are wholly (100%) based on the abbreviated word forms;

easier methodology. The applied methodology is partly similar to natural abbreviation methodologies, which were used, mainly for Latin language, in antiquity and early medieval era. Before introduction of paper into Europe, writing was done mainly on clay, wood, stone, papyrus and parchment, which were scarce and sometimes also expensive materials. For this reason, ancient and early medieval texts were written with abbreviations.

BRIEF DESCRIPTION OF THE DRAWING

FIG. 1 is a simplified graphical representation of a method of abbreviated typing and compression of texts, in accordance with the present invention.

SYSTEM OF JOINTLY AND GRADUALLY APPLIED ABBREVIATION METHODS (TECHNIQUES) EXAMPLES OF APPLICATION OF THE INVENTION

Methods (techniques) of abbreviation of the word forms are applied gradually (hierarchically) on the basis of the established statistical frequencies and availability of abbreviations fulfilling the necessary criteria. The word forms are abbreviated according to their statistical frequency. First the most frequent word form and then the second most frequent word form and so on. Every abbreviated word form or phrase is attributed only one unique and exclusive abbreviation, which is based on the letters contained in this abbreviated word form or phrase and in accordance with the order, in which these letters appear in the abbreviated word form or phrase.

In order to check the availability of abbreviation for a given word form:

firstly, one-letter abbreviation is drafted, secondly, abbreviation is drafted with the first and the last letter of the invariable part of the word plus full inflectional or conjugational prefix and suffix, thirdly, two-letter abbreviation is drafted, fourthly, abbreviation is drafted with the first letter of the invariable part of the word plus first consonant after this first letter plus the last letter of the invariable part of the word plus full inflectional or conjugational prefix and suffix, fifthly, three-letter abbreviation is drafted, sixthly, abbreviation is drafted with the first letter of the invariable part of the word plus first and second consonants after this first letter plus the last letter of the invariable part of the word plus full inflectional or conjugational prefix and suffix, seventhly, four-letter abbreviation is drafted.

The one-letter, two-letter, three-letter and four-letter abbreviations which are applied respectively in the first, third, fifth and seventh place are chosen according to the statistical frequency of the word forms in a way that allows the mathematically most efficient process of abbreviation of the text.

A search for an abbreviation drafted with the first and the last letter of the invariable part of the word plus full inflectional or conjugational prefix and suffix (an abbreviation drafted according to the method of pure contraction of the word stem) is performed only when there is no available one-letter abbreviation. And so on.

English Language

Methods (Techniques) of Drafting of Abbreviations for Word Forms

Truncation Method

The truncation method was widely used in ancient Roman sigla system as well as in medieval abbreviation systems. It consists in drafting one-letter, two-letter, three-letter and four-letter abbreviations, where a part of a word form is simply truncated (cut out from the rest of the letters). So it is based on the simple reduction of letters (omission of some letters; truncation of the part of the word form).

In this invention the truncation method refers in the first place to the very small group of the most frequent English word forms for which one-letter abbreviations are drafted. The word forms are chosen according to their statistical frequency in a way that allows the mathematically most efficient process of abbreviation of the text.

This statistical frequency of the word forms varies depending on the kind of texts that have been studied. The spoken language texts have different average frequencies of the word forms than the court judgements.

The truncation method also refers to irregular word forms or other word forms for which there is no abbreviation which could be drafted according to the methods (techniques) of pure or mixed contraction of the invariable part of the word. In this invention for such word forms two-letter abbreviations are drafted in the third place, three-letter abbreviations are drafted in the fifth place and four-letter abbreviations are drafted in the seventh place. These word forms are also chosen according to their statistical frequency in a way that allows the mathematically most efficient process of abbreviation of the text.

For example:

the article "the", is simply reduced (truncated) to one-letter abbreviation "t";

the conjunction "and" is simply reduced (truncated) to one-letter abbreviation "d";

the irregular modal verb form "would" for which there is no available one-letter abbreviation, nor any abbreviation which could be drafted according to the method (technique) of pure contraction of the invariable part of the word is reduced (truncated) to two-letter abbreviation "wd".

In the case of one-letter abbreviations, which are applied in the first place, the mathematically most efficient process of abbreviation of the text means that the word form "was" is abbreviated with the letter "w"—and not with the letter "s"—in order to allow the word form "is" to be abbreviated with the one-letter abbreviation "s". The word "the" is abbreviated with the letter "t"—and not with the letter "h" or with the letter "e"—in order to allow the word "that" to be abbreviated with the one-letter abbreviation "h" and the word form "are" to be abbreviated with the one-letter abbreviation "e", The word "for" is abbreviated with the letter "r"—and not with the letter "f" or with the letter "o"—in order to allow the word "of" to be abbreviated with the one-letter abbreviation "f" and the word "to" to be abbreviated with the one-letter abbreviation "o".

General Remarks Concerning the Methods (Techniques) of Pure Contraction and Mixed Contraction of the Invariable Part of the Word The new and inventive general idea for the word forms in different languages is that the variable part of the word (declinable part; inflectional or conjugational prefix or suffix) is never abbreviated and will always be fully typed, whereas it is the invariable part of the word (indeclinable part; word stem), which will be abbreviated according to the methods of pure contraction or mixed contraction.

Consequently, for the purposes of these methods, the abbreviation process concerns only the invariable part of a given word (the word stem). The variable inflectional or conjugational prefixes or suffixes (variable parts of a given word) are never abbreviated. This linguistic approach permits applying of the same system of abbreviation methods to the languages belonging to major Indo-European language families, such as Slavic, Romance and Germanic languages. In order to limit the total number of abbreviations, only frequent word forms of a given word are abbreviated.

In English language, the variable part of the word consists of the so called "inflectional suffix" ("inflectional ending") or "conjugational suffix" ("conjugational ending"), which will never be abbreviated when the methods of pure contraction and mixed contraction of the invariable part of the word are applied. This variable part of the word will always be fully typed. English language has no "inflectional prefixes" or "conjugational prefixes". Among languages described below only German language has such conjugational prefixes, in the case of some German verb forms.

The methods of pure contraction and mixed contraction of the invariable part of the word do not require strict memorisation of the abbreviations. It is sufficient to know that a particular word form has been abbreviated. If a user knows that a particular English word form has been abbreviated according to one of these methods, he or she will be able to reconstitute (to recall) abbreviations by applying those methods to this word form.

Method of Pure Contraction of the Invariable Part of the Word

The method consists in the so called pure contraction of the invariable part of the word (pure contraction of the word stem). Only the first and the last letter of the word stem are typed. After that operation, in this invention the full variable part of an English word (full inflectional suffix; full inflectional ending) is added in order to form the complete abbreviation.

All the middle letters of the word stem are omitted in typing. Complete abbreviation is formed by adding the full inflectional ending to the first and the last letter of the word stem. Of course, if there is an inflectional ending, because sometimes English words have one form only.

This method (technique) is applied in the second place, if there is no available one-letter abbreviation for a given word form.

For example:

in the case of the noun "activity" abbreviations will appear in the following manner:

activities aties activity aty only the first and the last letter of the invariable part of the word (word stem) are typed:

"activit"

+full variable part (full inflectional ending):

"ies" in the case of plural form;

"y" in the case of singular form.

In the case of the verb "believe" abbreviations will appear in the following manner:

believe bye believed bved believes byes believing bving only the first and the last letter of the invariable part of the word (word stem) are typed:

"believ"

+full variable part (full conjugational ending):

"e";
"ed";
"es";
"ing", according to different forms of this verb.

In the case of the adjective "particular" the abbreviation will appear in the following manner:

particular pr only the first and the last letter of the word are typed, because there is no other form of this adjective.

This is an example of pure contraction of the whole word (there is no variable part no inflectional ending).

Hence, in each of the above abbreviations, only the first and the last letter of the invariable part of the word (word stem) are typed+(if necessary) full variable part of the word (full inflectional suffix or full conjugational suffix).

Method of Mixed Contraction of the Invariable Part of the Word

This is a method of the so called mixed contraction of the word stem (mixed contraction of the invariable part of the word), to which the full variable part of the word (full inflectional ending; full inflectional suffix) is added in order to form the abbreviation.

It is the same as the method of pure contraction of the invariable part of the word, with the only difference that after the first letter of the word form the following consonant is written (or, if need be, the following two consonants). It is applied in the fourth place, when only one consonant is written after the first letter, and in the sixth place, when two consonants are written after the first letter of the abbreviated word form.

The initial letter of the word stem is typed, then the next consonant (or, if need be, also the second consonant), and then the last letter of the word stem. The complete abbreviation for a given word form is formed by adding the full inflectional ending.

The vowels in English writing are as follows:

a, e, i, o, u

The consonants in English writing are as follows:

b, c, d, f, g, h, j, k, l, m, n, p, q, r, s, t, v, w, x, z

Letter "y" sometimes represents a vowel and sometimes a consonant.

For the purposes of the method of mixed contraction of the invariable part of the word in this system, letter "y" is always considered as a vowel and never as a consonant.

For example:

in the case of the preposition "about" the abbreviation will appear in the following manner:

about abt the first letter of the invariable part of the word (in this case of the whole word) is written:

"a"

after which comes the first consonant:

"b"

after which comes the last letter:

"t".

In the case of the adverb (preposition) "between" the abbreviation will appear in the following manner:

between btn the first letter of the invariable part of the word (in this case of the whole word) is written:

"b"

after which comes the first consonant:

"t"

after which comes the last letter:

"n".

In the case of the verb "develop" the abbreviations will appear in the following manner:

develop dvp
developed dvped
developing dvping
develops dvps the first letter of the invariable part of the word (word stem) is written:

"d"

after which comes the first consonant:

"v"

after which comes the last letter of the invariable part of the word (word stem):

"p"

after which the full variable part of the word (full conjugational ending; full conjugational suffix) is added accordingly:

"ed" or
"ing" or
"s".

In the case of the noun "development" the abbreviations will appear in the following manner:

development dvt
developments dvts the first letter of the invariable part of the word (word stem) is written:

"d"

after which comes the first consonant:

"v"

after which comes the last letter of the invariable part of the word (word stem):

"t"

after which the full variable part of the word (full inflectional ending) is added:

"s"

In the case of the verb "remember" the abbreviations will appear in the following manner:

remember rmr
remembered rmred
remembering rmring
remembers rmrs the first letter of the invariable part of the word (word stem) is written:

"r"

after which comes the first consonant:

"m"

after which comes the last letter of the invariable part of the word (word stem):

"r"

after which the full variable part of the word (full conjugational ending) is added accordingly:

"ed" or
"ing" or
"s".

In the case of the noun "treatment" abbreviations will appear in the following manner:

treatment trt
treatments trts the first letter of the invariable part of the word (word stem) is written:

"t"

after which comes the first consonant:

"r"

after which comes the last letter of the invariable part of the word (word stem):

"t"

after which the full variable part of the word (full inflectional ending) is added:

"s".

In the case of the adverb (preposition) "beyond" the abbreviation will appear in the following manner:

beyond bnd the first letter of the invariable part of the word (in this case of the whole word) is written:

"b"

after which comes the first consonant:

"n"

(for the purposes of the method of mixed contraction of the invariable part of the word letter "y" is always considered as a vowel and never as a consonant)

after which comes the last letter:

"d".

In the case of the noun "information" the abbreviation will appear in the following manner:

information infn the first letter of the invariable part of the word (in this case of the whole word) is written:

"i"

after which comes the first consonant:

"n"

after which comes the second consonant:

"f"

after which comes the last letter:

"n".

Methods of Drafting of Abbreviations for the Phrases (Groups of Word Forms; Commonly Used Combinations of Word Forms)

General Remarks Concerning these Methods

Abbreviations are drafted for the phrases, which are frequent. In this invention a given phrase is abbreviated only when it results from the established statistical frequencies that abbreviating the composing word forms as parts of this phrase would result in overall mathematically more efficient process of abbreviation of the text.

The abbreviated phrase may contain a word form, which has its own individual abbreviation this is not an obstacle to abbreviate this phrase. That is, a given word form may have its own individual abbreviation, but this is not an obstacle to abbreviating phrases containing this word form as one of their elements (one of their component parts). When it is mathematically more efficient, such a phrase is abbreviated. However, in relation to other occurencies of this word form in the text—when this word form appears in different contexts in the text—this word form is attributed its own individual abbreviation. In this manner, the overall mathematically more efficient process of abbreviation of the whole text is achieved.

These methods are also applied gradually (hierarchically), firstly, the initialisation method, and secondly, the method of abbreviation of phrases distinguishing word forms composed of 4 or more letters.

Initialisation Method

This method is well known. It is based on typing of the initial letters of every word form contained in the abbreviated phrase. It is applied in the first place to a given phrase.

For example:

the abbreviation for the phrase "in order to" will appear in the following manner:

"iot"—the initial letters of every word form contained in the phrase have been joined together.

Method of Abbreviation of Phrases Distinguishing Word Forms Composed of 4 or More Letters This invention introduces new linguistic method (technique) for abbreviated typing and compression of the phrases. This new method is optimal from the linguistic point of view, because drafted abbreviations are not too long for the computer users and, in addition, almost all phrases, which could not be initialised, can be abbreviated according to this new method, which is applied in the second place that is only when initialisation method cannot be applied to a given phrase in the first place.

The new method is based on typing of the initial letters of the word forms contained in the phrase (as in the initialisation method), but when a given word form has more than 3 letters, then the initial and the last letter of this word form will create the abbreviation. On the contrary, when a given word form has less than 4 letters, then only its initial letter will create the abbreviation.

For Example:

the abbreviation for the phrase "according to" will appear in the following manner:

"agt".

The first word form has more than 3 letters, so both the initial and the last letter of this word form create the abbreviation:

"a" and

"g".

The second word form has less than 4 letters, so only the initial letter of this word form creates the abbreviation:

"t".

The abbreviation for the phrase "depending on" will appear in the following manner:

"dgo"

The first word form has more than 3 letters, so both the initial and the last letter of this word form create the abbreviation:

"d" and

"g".

The second word form has less than 4 letters, so only the initial letter of this word form creates the abbreviation:

"o".

Bulgarian Language

Methods of Drafting of Abbreviations for Word Forms

Truncation Method

For example:

the verb form " може ", is simply reduced (truncated) to one-letter abbreviation " ж ";

the verb form " трябва " is reduced (truncated) to one-letter abbreviation " р ";

the verb form "бъде" is reduced (truncated) to one-letter abbreviation "б";

the verb form "благодаря" is reduced (truncated) to two-letter abbreviation "бя".

Method of Pure Contraction of the Invariable Part of the Word

For example:

in the case of the noun "възможност" abbreviations will appear in the following manner:

възможност вт
възмож ността втта
възмож ности вти
възмож ностите втите only the first and the last letter of the invariable part of the word (word stem) are written:

възможност
+full variable part (inflectional suffix):
"та" in the case of the second singular form;
"и" and "ите" in the case of plural forms.

In the case of the adverb "повече" abbreviation will appear in the following manner:

повече пе only the first and the last letter of the word are written, because there is no other form of this adverb.

This is an example of pure contraction of the whole word (there is no variable part no inflectional suffix).

In the case of the noun "информация" abbreviations will appear in the following manner:

информация иия
информацията ииата
информации иии
информациите ииите
информациите ииите only the first and the last letter of the invariable part of the word (word stem) are written:

"информаци"
+full variable part (inflectional suffix):
"я" and "ята" in the case of singular forms;
"и" and "ите" in the case of plural forms.

Method of Mixed Contraction of the Invariable Part of the Word

The fully recognised vowels in Bulgarian writing are as follows:

а, е, и, о, у, ъ

The consonants in Bulgarian writing are as follows:

б, в, г, д, ж, з, й, к, л, м, н, п, р, с, т, ф, х, ц, ч, ш

Combinations of sounds represented by one letter in Bulgarian writing and all other letters are also treated as consonants in this system:

щ, ь, ю, я

For example:
in the case of the adverb "вероятно" the abbreviation will appear in the following manner:

вероятно вро the first letter of the invariable part of the word (in this case of the whole word) is written:

"в"
after which comes the first consonant:
"р"
after which comes the last letter:
"о".

In the case of the adverb "включително" the abbreviation will appear in the following manner:

включително вкло the first letter of the invariable part of the word (in this case of the whole word) is written:

"в"
after which comes the first consonant:
"к"
after which comes the second consonant:
"л"
after which comes the last letter:
"о".

In the case of the noun "интерес" abbreviations will appear in the following manner:

интерес инс
интереса инса
интересът инсът
интереси инси
интересите инсите the first letter of the invariable part of the word (word stem) is written:

"и"
after which comes the first consonant:
"н"
after which comes the last letter of the invariable part of the word (word stem):
"с"
after which the full variable part of the word (full inflectional suffix) is added:
"а" and "ът" for singular forms;
"и" and "ите" for plural forms.

In the case of the noun "отговорност" abbreviations will appear in the following manner:

отговорност отт
отговорността оттта
отговорности отти
отговорностите оттите the first letter of the invariable part of the word (word stem) is written:

"о"
after which comes the first consonant:
"т"
after which comes the last letter of the invariable part of the word (word stem):
"т"
after which the full variable part of the word (full inflectional suffix) is added:
"та" for singular form;
"и" and "ите" for plural forms.

Methods of Drafting of Abbreviations for the Phrases (Groups of Word Forms)

Initialisation Method

For example:

the abbreviation for the phrase "по отношение на" will appear in the following manner:

"пон"—the initial letters of every word form contained in the phrase have been joined together.

Method Distinguishing Word Forms Composed of 4 or More Letters

For example:

the abbreviation for the phrase "независимо от" will appear in the following manner:

" ноо".

The first word form has more than 3 letters, so both the initial and the last letter of this word form create the abbreviation:

"н" and

"о",

The second word form has less than 4 letters, so only the initial letter of this word form creates the abbreviation:

"о".

The abbreviation for the phrase " при условие че" will appear in the following manner:

" пуеч".

The first word form has less than 4 letters, so only the initial letter of this word form creates the abbreviation:

" п".

The second word form has more than 3 letters, so both the initial and the last letter of this word form create the abbreviation:

"у" and

"е".

The third word form has less than 4 letters, so only the initial letter of this word form creates the abbreviation:

" ч".

French Language

Methods of Drafting of Abbreviations for Word Forms

Truncation Method

For example:

the adverb " également" is simply reduced (truncated) to one-letter abbreviation "g";

the noun " chose" is simply reduced (truncated) to one-letter abbreviation "h";

the irregular verb form " connaître" is simply reduced (truncated) to one-letter abbreviation " î";

the pronoun " tous" is reduced (truncated) to two-letter abbreviation " ts".

Method of Pure Contraction of the Invariable Part of the Word

For example:

in the case of the adverb " beaucoup" abbreviation will appear in the following manner:

beaucoup bp only the first and the last letter of the word are written, because there is no other form of this adverb.

This is an example of pure contraction of the whole word (there is no variable part).

In the case of the adverb " maintenant" abbreviation will appear in the following manner:

maintenant mt only the first and the last letter of the word are written, because there is no other form of this adverb.

This is also an example of pure contraction of the whole word (there is no variable part).

In the case of the noun " personne" the proposed abbreviations will appear in the following manner:

personne pe personnes pes

1) only the first and the last letter of the invariable part of the word (word stem) are written:

"p" and "e".

2) +full variable part (in this case full inflectional suffix):

"s".

In the case of the noun " rapport" the proposed abbreviations will appear in the following manner:

rapport rt rapports rts

1) only the first and the last letter of the invariable part of the word (word stem) are written:

"r" and "t".

2) +full variable part (in this case full inflectional suffix):

"s".

In the case of the verb "regarder" the proposed abbreviations will appear in the following manner:

regarde rde regarder rder regardez rdez

1) only the first and the last letter of the invariable part of the word (word stem) are written:

"r" and "d"

2) +full variable part (full conjugational suffix) at the end:

"e";

"er";

"ez".

Method of Mixed Contraction of the Invariable Part of the Word

The vowels in French writing are as follows:

a, à, â, ä, e, é, è, ê, ë, i, î, ï, o, ô, ö, u, ù, û, ü, y, ÿ

The consonants in French writing are as follows:

b, c, ç, d, f, g, h, j, k, l, m, n, p, q, r, s, t, v, w, x, z

For example:

in the case of the adverb "comment" the abbreviation will appear in the following manner:

comment cmt the first letter of the invariable part of the word (in this case of the whole word) is written:

"c"

after which comes the first consonant:

"m"

after which comes the last letter:

"t".

In the case of the adverb "toujours" abbreviation will appear in the following manner:

toujours tjs the first letter of the invariable part of the word (in this case of the whole word) is written:

"t"

after which comes the first consonant:

"j"

after which comes the last letter:

"s".

In the case of the adverb " désormais" abbreviation will appear in the following manner:

désormais dsrs the first letter of the invariable part of the word (in this case of the whole word) is written:

"d"

after which comes the first consonant:

"s"

after which comes the second consonant:

"r"

after which comes the last letter:

"s".

In the case of the noun "décision" the proposed abbreviations will appear in the following manner:

décision dcn décisions dcns the first letter of the invariable part of the word (word stem) is written:

"d"

after which comes the first consonant:

"c"

after which comes the last letter of the invariable part of the word (word stem):

"n"

after which in one of the abbreviations the full variable part of the word (full inflectional suffix) is added accordingly:

"s".

In the case of the noun "information" the proposed abbreviations will appear in the following manner:

information inn informations inns the first letter of the invariable part of the word (word stem) is written:

"i"

after which comes the first consonant:

"n"

after which comes the last letter of the invariable part of the word (word stem):

"n"

after which in one of the abbreviations the full variable part of the word (full inflectional suffix) is added accordingly:

"s",

Methods of Drafting of Abbreviations for the Phrases (Groups of Word Forms)

General Remark Concerning the Initialisation Method and the Method Distinguishing Word Forms Composed of 4 or More Letters French word forms divided by a dash (hyphen; tiret) or apostrophe (') are treated as separate word forms.

Initialisation Method

The abbreviation for the phrase "à l'égard de" will appear in the following manner:

"àléd"—the initial letters of every word form contained in the phrase have been joined together.

Method Distinguishing Word Forms Composed of 4 or More Letters

For example:

the abbreviation for the phrase "en effet" will appear in the following manner:

"eet"

The first word form has less than 4 letters, so only the initial letter of this word form creates the abbreviation:

"e".

The second word form has more than 3 letters, so both the initial and the last letter of this word form create the abbreviation:

"e" and

"t".

The abbreviation for the phrase "jusqu'à" will appear in the following manner:

"juà"

The first word form has more than 3 letters, so both the initial and the last letter of this word form create the abbreviation:

"j" and

"u".

The second word form has less than 4 letters, so only the initial letter of this word form creates the abbreviation:

"à".

German Language

Methods of Drafting of Abbreviations for Word Forms

Truncation Method

For example:

the article "der", is simply reduced (truncated) to one-letter abbreviation "r";

the preposition "über" is simply reduced (truncated) to one-letter abbreviation "ü";

the irregular verb form "können" is simply reduced (truncated) to one-letter abbreviation "ö";

the irregular verb form "haben" is reduced (truncated) to two-letter abbreviation "hn".

General Remarks Concerning Methods of Pure Contraction and Mixed Contraction of the Invariable Part of the Word In German language, the variable parts of the word may sometimes consist both of a variable part at the end of the word as well as of a variable part at the beginning of the word (in the case of many German verbs, when they are conjugated). Often it is the conjugational prefix "ge" in the past participle form of some verbs, but sometimes also other movable prefixes in front of some German verbs. These variable parts of the German verbs will never be abbreviated and will always be fully written.

For example, in the case of the verb "machen":

in the word form "gemacht" (the past participle form of this verb) the variable part at the beginning (the conjugational prefix) is represented by the letters "ge". This variable part in front of the word stem will never be abbreviated.

In this case the conjugational suffix is represented by the letter "t" and, similarly, will never be abbreviated.

Another preliminary remark concerns German umlaut appearing in plural forms of some words. For the purposes of this system additional umlaut in the word stem of some plural forms is not considered as a change (a variation) of the word stem. In other words, additional umlaut in plural form does not influence the way in which abbreviations are drafted for a particular German word. This remark concerns mainly German nouns and verbs, which sometimes have additional umlaut in the plural form.

For example:

the noun "Land" has the plural form "Länder". The additional umlaut in the word stem in plural form will not influence the manner in which abbreviations are drafted.

Method of Pure Contraction of the Invariable Part of the Word

For example:

in the case of the adverb "jetzt" abbreviation will appear in the following manner:

jetzt jt only the first and the last letter of the word are written, because there is no other form of this adverb.

This is an example of pure contraction of the whole word (there is no variable part).

In the case of the adverb "vielleicht" the abbreviation will appear in the following manner:

vielleicht vt only the first and the last letter of the word are written, because there is no other form of this adverb.

This is also an example of pure contraction of the whole word (there is no variable part).

In the case of the noun "Ordnung" the proposed abbreviation will appear in the following manner:

Ordnung og only the first and the last letter of the invariable part of the word (word stem) are written:

"o" and "g". In order to facilitate and speed up typing, it is sufficient to type the small letter "o".

In the case of the noun "Jahr" the proposed abbreviations will appear in the following manner:

Jahr jr

Jahre jre

Jahren jren

Jahres jres

1) only the first and the last letter of the invariable part of the word (word stem) are written:

"j" and "r". In order to facilitate and speed up typing, it is sufficient to type the small letter "j".

2) +full variable part (in this case full inflectional suffix):

"e";

"en";

"es".

In the case of the noun "Land" the proposed abbreviations will appear in the following manner:

Land ld

Landes ldes

Länder lder

Ländern ldern

1) only the first and the last letter of the invariable part of the word (word stem) are written:

"l" and "d". In order to facilitate and speed up typing, it is sufficient to type the small letter "l". The additional umlaut in plural form of this word does not influence the manner in which the abbreviations are drafted.

2) +full variable part (in this case full inflectional suffix):

"es" in singular form;

"er" in plural form;

"ern" in another plural form.

In the case of the verb "machen" the proposed abbreviations will appear in the following manner:

gemacht gemht mach mh mache mhe machen mhen machst mhst macht mht machte mhte

1) only the first and the last letter of the invariable part of the word (word stem) are written:

"m" and "h"

2) +full variable part(s):

"ge" in front and "t" at the end, in the abbreviation for the past participle form of this verb;

"e";

"en";

"st";

"t";

"te"

at the end, according to other abbreviated forms of this verb.

Method of Mixed Contraction of the Invariable Part of the Word

The vowels in German writing are as follows:

a, ä, e, i, o, ö, u, ü, y

The consonants in German writing are as follows:

b, c, d, f, g, h, j, k, l, m, n, p, q, r, s, ß, t, v, w, x, z

For example:

in the case of the preposition "gegen" the abbreviation will appear in the following manner:

gegen ggn the first letter of the invariable part of the word (in this case of the whole word) is written:

"g"

after which comes the first consonant:

"g"

after which comes the last letter:

"n".

In the case of the preposition "zwischen" the abbreviation will appear in the following manner:

zwischen zwn the first letter of the invariable part of the word (in this case of the whole word) is written:

"z"

after which comes the first consonant:

"w"

after which comes the last letter:

"n".

In the case of the adverb "beispiel sweise" the abbreviation will appear in the following manner:

beispiel sweise bspe the first letter of the invariable part of the word (in this case of the whole word) is written:

"b"

after which comes the first consonant:

"s"

after which comes the second consonant:

"p"

after which comes the last letter:

"e".

In the case of the noun "Entschei dung" the proposed abbreviations will appear in the following manner:

Entschei dung  entg
Entschei dungen  entgen the first letter of the invariable part of the word (word stem) is written:
"e"
after which comes the first consonant:
"n"
after which comes the second consonant:
"t"
after which comes the last letter of the invariable part of the word (word stem):
"g"
after which, in one of the abbreviations, the full variable part of the word (full inflectional suffix) is added accordingly:
"en".

In the case of the noun "Information" the proposed abbreviations will appear in the following manner:

Information  infn

Inform ationen  infnen the first letter of the invariable part of the word (word stem) is written:
"i"
after which comes the first consonant:
"n"
after which comes the second consonant:
"f"
after which comes the last letter of the invariable part of the word (word stem):
"n"
after which, in one of the abbreviations, the full variable part of the word (full inflectional suffix) is added accordingly:
"en".

In the case of the noun "Grund" the proposed abbreviations will appear in the following manner:

Grund  grd

Gründe  grde
Gründen  grden the first letter of the invariable part of the word (word stem) is written:
"g"
after which comes the first consonant:
"r"
after which comes the last letter of the invariable part of the word (word stem):
"d"
after which the full variable part of the word (full inflectional suffix) is added accordingly:
"e";
"en"

The additional umlaut in the plural form of this word does not influence the manner in which the abbreviations are drafted.

In the case of the noun "Möglich keit" the proposed abbreviations will appear in the following manner:

Möglich keit  mgt
Möglich keiten  mgten the first letter of the invariable part of the word (word stem) is written:
"m"
after which comes the first consonant:
"g"
after which comes the last letter of the invariable part of the word (word stem):
"t",
after which, in one of the abbreviations, the full variable part of the word (full inflectional suffix) is added accordingly:
"en".

In the case of the adverb "wahrsch einlich" the abbreviation will appear in the following manner:

wahrsch einlich  whh the first letter of the invariable part of the word (in this case of the whole word) is written:
"w"
after which comes the first consonant:
"h"
after which comes the last letter of the word:
"h".

This is an example of mixed contraction of the whole word (there is no variable part of this word).

Methods of Drafting of Abbreviations for the Phrases (Groups of Word Forms)

Initialisation Method

The abbreviation for the phrase "vor allem" will appear in the following manner:
"va"—the initial letters of every word form contained in the phrase have been joined together.

Method Distinguishing Word Forms Composed of 4 or More Letters

For example:
the abbreviation for the phrase "im Rahmen" will appear in the following manner:
"irn"
The first word form has less than 4 letters, so only the initial letter of this word form creates the abbreviation:
"i".
The second word form has more than 3 letters, so both the initial and the last letter of this word form create the abbreviation:
"r" and
"n".
The abbreviation for the phrase "abgesehen von" will appear in the following manner:
"anv".
The first word form has more than 3 letters, so both the initial and the last letter of this word form create the abbreviation:
"a" and
"n".
The second word form has less than 4 letters, so only the initial letter of this word form creates the abbreviation:

Polish Language

Methods of Drafting of Abbreviations for Word Forms

Truncation Method

For example:
the adverb "bardzo" is simply reduced (truncated) to one-letter abbreviation "r";

the noun "dzień" is simply reduced (truncated) to one-letter abbreviation "ń";

the irregular verb form "może" is simply reduced (truncated) to one-letter abbreviation "m";

the irregular verb form "jesteś" is reduced (truncated) to two-letter abbreviation "jś".

Method of Pure Contraction of the Invariable Part of the Word

For example:

in the case of the adverb "teraz" abbreviation will appear in the following manner:

teraz tz only the first and the last letter of the word are written, because there is no other form of this adverb.

This is an example of pure contraction of the whole word (there is no variable part).

In the case of the particle "również" abbreviation will appear in the following manner:

również rż only the first and the last letter of the word are written, because there is no other form of this particle.

This is also an example of pure contraction of the whole word (there is no variable part).

In the case of the noun "czas" the proposed abbreviations will appear in the following manner:

czas cs czasem cscm czasie csie czasu csu

1) only the first and the last letter of the invariable part of the word (word stem) are written:

"c" and "s".

2) +full variable part (full inflectional suffix):

"em";

"ie";

"u".

Method of Mixed Contraction of the Invariable Part of the Word

The vowels in Polish writing are as follows:

a, ą, e, ę, i, o, ó, u, y

The consonants in Polish writing are as follows:

b, c, ć, d, f, g, h, j, k, l, ł, m, n, ń, p, r, s, ś, t, w, z, ź, ż

Letters q, v, x contained in the words of foreign origin are also treated as consonants.

For example:

in the case of the conjunction "jednak" abbreviation will appear in the following manner:

jednak jdk the first letter of the invariable part of the word (in this case of the whole word) is written:

"j"

after which comes the first consonant:

"d"

after which comes the last letter:

"k".

In the case of the adverb "zawsze" abbreviation will appear in the following manner:

zawsze zwe the first letter of the invariable part of the word (in this case of the whole word) is written:

"z"

after which comes the first consonant:

"w"

after which comes the last letter:

"e".

In the case of the adverb "natychmiast" abbreviation will appear in the following manner:

natychmiast ntt the first letter of the invariable part of the word (in this case of the whole word) is written:

"n"

after which comes the first consonant:

"t"

after which comes the last letter:

"t".

In the case of the noun "sprawa" the proposed abbreviations will appear in the following manner:

spraw spw sprawa spwa sprawą spwą sprawę spwę sprawie spwie sprawy spwy the first letter of the invariable part of the word (word stem) is written:

"s"

after which comes the first consonant:

"p"

after which comes the last letter of the invariable part of the word (word stem):

"w"

after which the full variable part of the word (full inflectional suffix) is added accordingly:

"a";

"ą"

"ę"

"ie"

"y".

Methods of Drafting of Abbreviations for the Phrases (Groups of Word Forms)

Initialisation Method

The abbreviation for the phrase "co njmniej" will appear in the following manner:

"cn"—the initial letters of every word form contained in the phrase have been joined together.

Method Distinguishing Word Forms Composed of 4 or More Letters

For example:

the abbreviation for the phrase "na podstawie" will appear in the following manner:

"npe".

The first word form has less than 4 letters, so only the initial letter of this word form creates the abbreviation:

"n",

The second word form has more than 3 letters, so both the initial and the last letter of this word form create the abbreviation:

"p" and

"e".

The abbreviation for the phrase "przede wszystkim" will appear in the following manner:

"pewm".

The first word form has more than 3 letters, so both the initial and the last letter of this word form create the abbreviation:

"p" and
"e".

The second word form has more than 3 letters, so both the initial and the last letter of this word form create the abbreviation:

"w" and
"m".

Russian Language

Methods of Drafting of Abbreviations for Word Forms

Truncation Method

For example:

the adverb "больше" is simply reduced (truncated) to one-letter abbreviation "ш";

the noun "факт" is simply reduced (truncated) to one-letter abbreviation "Ф";

the irregular verb form "будет" is simply reduced (truncated) to two-letter abbreviation "бт";

the irregular verb form "может" is reduced (truncated) to two-letter abbreviation "мт",

Method of Pure Contraction of the Invariable Part of the Word

For example:

in the case of the adverb "теперь" abbreviation will appear in the following manner:

теперь тъ only the first and the last letter of the word are written, because there is no other form of this adverb.

This is an example of pure contraction of the whole word (there is no variable part).

In the case of the conjunction "чтобы" abbreviation will appear in the following manner:

чтобы чы only the first and the last letter of the word are written, because there is no other form of this conjunction.

This is also an example of pure contraction of the whole word (there is no variable part).

In the case of the noun "правда" the proposed abbreviations will appear in the following manner:

правда пда
правду пду

1) only the first and the last letter of the invariable part of the word (word stem) are written:

"н" and "д".

2) +full variable part (full inflectional suffix):

"а";
"у".

Method of Mixed Contraction of the Invariable Part of the Word

The fully recognised vowels in Russian writing are as follows:

а, е, ё, и, о, у, ы, э, ю, я

The consonants in Russian writing are as follows:

б, в, г, д, ж, з, й, к, л, м, н, п, р, с, т, ф, х, ц, ч, ш, щ

All other Russian letters are also treated as consonants in this system:

ь, ъ

For example:

in the case of the adverb "никогда" abbreviation will appear in the following manner:

никогда нка the first letter of the invariable part of the word (in this case of the whole word) is written:

"н"

after which comes the first consonant:

"к"

after which comes the last letter:

"а".

In the case of the conjunction "потому" abbreviation will appear in the following manner:

потому пту the first letter of the invariable part of the word (in this case of the whole word) is written:

"п", after which comes the first consonant:

"т"

after which comes the last letter:

"у".

In the case of the adverb "слишком" abbreviation will appear in the following manner:

слишком слм the first letter of the invariable part of the word (in this case of the whole word) is written:

"с"

after which comes the first consonant:

"л"

after which comes the last letter:

"м".

In the case of the noun "вопрос" the proposed abbreviations will appear in the following manner:

вопрос впс
вопроса впса
вопросов впсов
вопросы впсы the first letter of the invariable part of the word (word stem) is written:

"в", after which comes the first consonant:

"п"

after which comes the last letter of the invariable part of the word (word stem):

"с"

after which the full variable part of the word (full inflectional suffix) is added accordingly:

"ов";
"ы".

Methods of Drafting of Abbreviations for the Phrases (Groups of Word Forms)

Initialisation Method

The abbreviation for the phrase "на самом деле" will appear in the following manner:

"нсд"—the initial letters of every word form contained in the phrase have been joined together.

Method Distinguishing Word Forms Composed of 4 or More Letters

For example:

the abbreviation for the phrase "тем более" will appear in the following manner:

"тбе".

The first word form has less than 4 letters, so only the initial letter of this word form creates the abbreviation:

"т".

The second word form has more than 3 letters, so both the initial and the last letter of this word form create the abbreviation:

"б" and

"е".

The abbreviation for the phrase "таким таким" will appear in the following manner:

"тмом".

The first word form has more than 3 letters, so both the initial and the last letter of this word form create the abbreviation:

"т" and

"м".

The second word form has more than 3 letters, so both the initial and the last letter of this word form create the abbreviation:

"о" and

"м".

Spanish Language

Methods of Drafting of Abbreviations for Word Forms

Truncation Method

For example:

the conjunction "que" is simply reduced (truncated) to one-letter abbreviation "q";

the noun "vez" is simply reduced (truncated) to one-letter abbreviation "z";

the adjective (adverb) "mejor" is simply reduced (truncated) to one-letter abbreviation "j";

the pronoun "todos" is reduced (truncated) to two-letter abbreviation "ts".

General Remarks Concerning Methods of Pure Contraction and Mixed Contraction of the Invariable Part of the Word For the purposes of this system additional accent in the word stem in some Spanish word forms is not considered as a change (a variation) of the word stem. That is to say, the additional accent in some word forms of a particular Spanish word does not influence the way in which the abbreviations are drafted for these word forms.

Method of Pure Contraction of the Invariable Part of the Word

For example:

in the case of the adverb "jamás" abbreviation will appear in the following manner:

jamás js only the first and the last letter of the word are written, because there is no other form of this adverb.

This is also an example of pure contraction of the whole word (there is no variable part).

In the case of the noun "persona" the proposed abbreviations will appear in the following manner:

persona pa personas pas

1) only the first and the last letter of the invariable part of the word (word stem) are written:

"p" and "a".

2) +full variable part (full inflectional suffix):

"s".

In the case of the noun "lugar" the proposed abbreviations will appear in the following manner:

lugar lr lugares lres

1) only the first and the last letter of the invariable part of the word (word stem) are written:

"l" and "r".

2) +full variable part (in this case full inflectional suffix):

"es".

In the case of the verb "necesitar" the proposed abbreviations will appear in the following manner:

necesita nta necesitaba ntaba necesitamos ntamos necesitan ntan necesitas ntas necesito nto

1) only the first and the last letter of the invariable part of the word (word stem) are written:

"n" and "t"

2) +full variable part (full conjugational suffix):

"a";

"aba"

"amos";

"an"

"as";

"o"

at the end, according to the abbreviated forms of this verb.

Method of Mixed Contraction of the Invariable Part of the Word

The vowels in Spanish writing are as follows:

a, á, e, é, i, í, o, ó, u, ú, ü

The single letter consonants in Spanish writing are as follows:

b, c, d, f, g, h, j, k, l, m, n, ñ, p, q, r, s, t, v, w, x, y, z

For example:

in the case of the adverb "después" the abbreviation will appear in the following manner:

después dss the first letter of the invariable part of the word (in this case of the whole word) is written:

"d"

after which comes the first consonant:

"s"

after which comes the last letter:

"s".

In the case of the adverb "entonces" abbreviation will appear in the following manner:

entonces ens the first letter of the invariable part of the word (in this case of the whole word) is written:

"e"

after which comes the first consonant:

"n"

after which comes the last letter:

"s".

In the case of the noun "hombre" the proposed abbreviations will appear in the following manner:

hombre hme hombres hmes the first letter of the invariable part of the word (word stem) is written:

"h"

after which comes the first consonant:

"m"

after which comes the last letter of the invariable part of the word (word stem):

"e"

after which, in one of the abbreviations, the full variable part of the word (full inflectional suffix) is added accordingly:

"s".

In the case of the noun "tiempo" the proposed abbreviations will appear in the following manner:

tiempo tmo
tiempos tmos the first letter of the invariable part of the word (word stem) is written:

"t"

after which comes the first consonant:

"m"

after which comes the last letter of the invariable part of the word (word stem):

"o"

after which, in one of the abbreviations, the full variable part of the word (full inflectional suffix) is added accordingly:

"s".

Methods of Drafting of Abbreviations for the Phrases (Groups of Word Forms)

Initialisation Method

The abbreviation for the phrase "por qué" will appear in the following manner:

"pq"—the initial letters of every word form contained in the phrase have been joined together.

Method Distinguishing Word Forms Composed of 4 or More Letters

For example:

the abbreviation for the phrase "lo siento" will appear in the following manner:

"lso".

The first word form has less than 4 letters, so only the initial letter of this word form creates the abbreviation:

"l".

The second word form has more than 3 letters, so both the initial and the last letter of this word form create the abbreviation:

"s" and

"o".

The abbreviation for the phrase "en consecuencia" will appear in the following manner:

"eca"

The first word form has less than 4 letters, so only the initial letter of this word form creates the abbreviation:

"e".

The second word form has more than 3 letters, so both the initial and the last letter of this word form create the abbreviation:

"c" and

"a".

The invention claimed is:

1. A computer-implemented method of abbreviating words of a body of text written in a spoken language, input by a user comprising the steps of:
   determining a statistical frequency of all word forms in a predetermined set of texts;
   selecting word forms having a statistical frequency above a predetermined level to receive abbreviations;
   selecting and assigning, hierarchically, the shortest available abbreviations to the most frequent word forms, by:
      assigning for the first most frequent word form, a shortest formulated abbreviation for that word form, which abbreviation is not itself a word in the spoken language; and
      assigning, in descending order of most frequent word forms, the shortest formulated abbreviation for that word form, which abbreviation is not itself a word in the spoken language, and which has not been previously assigned to a statistically more frequent word form;
   wherein the shortest formulated abbreviation of a word form is selected by performing the following steps, in order, until an abbreviation is available, as follows:
      formulating a one-letter abbreviation by truncation;
      formulating an abbreviation consisting of a first letter and a last letter of an invariable part of the word form, plus full inflectional or conjugational prefix and suffix, if applicable;
      formulating a two-letter abbreviation by truncation;
      formulating an abbreviation consisting of the first letter of the invariable part of the word form plus a first consonant after the first letter, plus the last letter of the invariable part of the word form plus full inflectional or conjugational prefix and suffix, if applicable;
      formulating a three-letter abbreviation by truncation;
      formulating an abbreviation consisting of the first letter of the invariable part of the word form plus the first consonant and a second consonant after the first letter plus the last letter of the invariable part of the word form, plus full inflectional or conjugational prefix and suffix, if applicable; and
      formulating a four-letter abbreviation by truncation;
   providing a word processing program for typing input by a user; and
   applying the abbreviations to the body of text,
   wherein when a user types a series of keystrokes corresponding to an abbreviation assigned to a word form, the typed abbreviation is automatically expanded into the assigned word form.

2. The computer-implemented method of abbreviating words of a body of text of claim 1, further comprising the steps of:

determining a statistical frequency of commonly used phrases in the predetermined set of texts;

selecting commonly used phrases having a statistical frequency above a predetermined level to receive abbreviations;

selecting and temporarily assigning, hierarchically, the shortest available abbreviations to the most frequent selected phrases by:

assigning for the first most frequent phrase, a shortest formulated abbreviation for that phrase, which abbreviation is not itself a word in the spoken language, and which abbreviation has not been previously assigned to a word form;

assigning, in descending order of most frequent phrases, the shortest formulated abbreviation for that phrase, which abbreviation is not itself a word in the spoken language, and which has not been previously assigned to a word form or a statistically more frequent phrase;

wherein the shortest formulated abbreviation of a phrase is selected by performing the following steps, in order, until an abbreviation is available, as follows:

formulating a first phrase abbreviation consisting of the initial letters of every word in the phrase, in order, joined together;

formulating a second phrase abbreviation for phrases comprising a word form having four or more letters consisting of the following, joined together, in order:

for words having three or fewer letters, the initial letter of each word; and for words having four or more letters, the initial letter of each word and the last letter of each word;

comparing a total character count of the temporarily assigned abbreviation to a total character count of the sum of characters of abbreviations assigned to all of the words in the phrase, if said abbreviations have been previously assigned; and assigning permanently the temporarily assigned phrase abbreviation only if the total character count of the temporarily assigned abbreviations is less than the total character count of the sum of characters of abbreviations assigned to all of the words in the phrase.

3. A storage device on which a computer program is stored, the computer program comprising program code means that control a computer or another electronic device on which it is run to carry out the computer-implemented method according to claim 1.

4. A computer or another electronic device that is configured or controlled to carry out the computer-implemented method according to claim 1.

5. A non-transitory computer-readable medium containing executable instructions configured to carry out the computer-implemented method according to claim 1.

6. A computer-implemented method of abbreviating words of a body of text written in a spoken language, input by a user comprising the steps of:

determining a statistical frequency of all word forms in a predetermined set of texts;

selecting word forms having a statistical frequency above a predetermined level to receive abbreviations;

selecting and assigning, hierarchically, the shortest available abbreviations to the most frequent word forms, by:

assigning for the first most frequent word form, a shortest formulated abbreviation for that word form, which abbreviation is not itself a word in the spoken language; and assigning, in descending order of most frequent word forms, the shortest formulated abbreviation for that word form, which abbreviation is not itself a word in the spoken language, and which has not been previously assigned to a statistically more frequent word form;

wherein the shortest formulated abbreviation of a word form is selected by performing the following steps, in order, until an abbreviation is available, as follows:

formulating a one-letter abbreviation by truncation;

formulating an abbreviation consisting of a first letter and a last letter of an invariable part of the word form, plus full inflectional or conjugational prefix and suffix, if applicable;

formulating a two-letter abbreviation by truncation;

formulating an abbreviation consisting of the first letter of the invariable part of the word form plus a first consonant after the first letter, plus the last letter of the invariable part of the word form plus full inflectional or conjugational prefix and suffix, if applicable;

formulating a three-letter abbreviation by truncation;

formulating an abbreviation consisting of the first letter of the invariable part of the word form plus the first consonant and a second consonant after the first letter plus the last letter of the invariable part of the word form, plus full inflectional or conjugational prefix and suffix, if applicable; and formulating a four-letter abbreviation by truncation;

providing a word processing program for typing input by a user;

applying the abbreviations to the body of text; and outputting the body of text, with word forms replaced with assigned abbreviations to produce a condensed body of text.

7. The computer-implemented method of claim 6, further comprising:

processing the condensed body of text by replacing abbreviations in the condensed body of text with corresponding word forms to yield the original body of text.

8. The computer-implemented method of claim 6, wherein the condensed body of text is human readable.

9. The computer-implemented method of claim 6, further comprising the steps of:

determining a statistical frequency of commonly used phrases in the predetermined set of texts;

selecting commonly used phrases having a statistical frequency above a predetermined level to receive abbreviations;

selecting and temporarily assigning, hierarchically, the shortest available abbreviations to the most frequent selected phrases by:

assigning for the first most frequent phrase, a shortest formulated abbreviation for that phrase, which abbreviation is not itself a word in the spoken language, and which abbreviation has not been previously assigned to a word form;

assigning, in descending order of most frequent phrases, the shortest formulated abbreviation for that phrase, which abbreviation is not itself a word in the spoken language, and which has not been previously assigned to a word form or a statistically more frequent phrase;

wherein the shortest formulated abbreviation of a phrase is selected by performing the following steps, in order, until an abbreviation is available, as follows:

formulating a first phrase abbreviation consisting of the initial letters of every word in the phrase, in order, joined together;

formulating a second phrase abbreviation for phrases comprising a word form having four or more letters consisting of the following, joined together, in order:

for words having three or fewer letters, the initial letter of each word; and for words having four or more letters, the initial letter of each word and the last letter of each word;

comparing a total character count of the temporarily assigned abbreviation to a total character count of the sum of characters of abbreviations assigned to all of the words in the phrase, if said abbreviations have been previously assigned; and assigning permanently the temporarily assigned phrase abbreviation only if the total character count of the temporarily assigned abbreviations is less than the total character count of the sum of characters of abbreviations assigned to all of the words in the phrase.

10. A storage device on which a computer program is stored, the computer program comprising program code means that control a computer or another electronic device on which it is run to carry out the computer-implemented method according to claim 6.

11. A computer or another electronic device that is configured or controlled to carry out the computer-implemented method according to claim 6.

12. A non-transitory computer-readable medium containing executable instructions configured to carry out the computer-implemented method according to claim 6.

* * * * *